Patented Mar. 4, 1952

2,588,051

UNITED STATES PATENT OFFICE 2,588,051

PRODUCTION OF CELLULOSE ESTERS

Eric P. Sharman and Donald L. Wilson, Coventry, England, assignors to Courtaulds Limited, London, England, a British company No Drawing. Application July 10, 1950, Serial No. 173,012. In Great Britain August 9, 1949

2 Claims. (Cl. 260—230)

This invention relates to the production of secondary, or acetone-soluble, cellulose esters.

According to one known process for the production of secondary cellulose acetate, a primary cellulose acetate is first formed by esterifying cellulose, pretreated with acetic acid, with acetic anhydride in the presence of sulphuric acid as catalyst and methylene chloride which together with the acetic acid forms a solvent medium for the cellulose triacetate as it is formed; the cellulose triacetate solution obtained normally contains from 50 to 60 per cent by weight of methylene chloride. The solution is then hydrolysed by adding water and a further quantity of sulphuric acid to form an emulsion and stirring the emulsion until the hydrolysis has proceeded sufficiently to form a cellulose acetate which is acetone-soluble. The hydrolysis is normally effected in two stages, the first stage being effected under pressure until the acetyl content is reduced to about 59 per cent and the second stage being effected at atmospheric pressure, the total process usually taking about 6 to 8 hours.

It is the object of the present invention to reduce the time required for the hydrolysis.

In accordance with the present invention, a process for the production of secondary cellulose esters comprises esterifying cellulose in the presence of methylene chloride to form a cellulose triester solution which contains from 50 to 60 per cent of methylene chloride by weight, removing methylene chloride from the solution until its content is reduced to from 30 to 45 per cent by weight, based on the weight of the original solution, and hydrolysing the cellulose triester to a secondary cellulose ester. The removal of the methylene chloride may conveniently be effected by distillation.

In carrying out the process of the invention, preferably from 45 to 60 per cent of the total weight of methylene chloride in the cellulose triester solution is removed.

The terms "cellulose triester" or "cellulose triacetate" as used herein mean cellulose esters or cellulose acetate containing 2.90 or more ester or acetyl groups per anhydroglucose unit in the cellulose.

In the process as hitherto carried out using methylene chloride as solvent, the hydrolysing agents, namely sulphuric acid and water, are not completely soluble in the triester solution so that on adding these agents, an emulsion is formed and the effective hydrolysing agents are therefore only those dissolved in the phase containing the methylene chloride. In accordance with the present invention, the amount of methylene chloride in the solution is reduced to such an extent that the phase distribution is altered in favour of the solution of water and sulphuric acid in the phase containing the methylene chloride. This alteration is believed to lead to the more rapid hydrolysis obtained in the process according to the invention, usually about 3 to 5 hours.

The hydrolysis is preferably conducted in two stages at raised temperature as in prior practice, by first reducing the acyl content to about 59 per cent under pressure and completing the hydrolysis at atmospheric pressure. The hydrolysis may, however, be effected under pressure in a single stage.

The hydrolysis agents may be added to the cellulose triester solutions before, during or after the removal of the methylene chloride. The removal of the methylene chloride may be effected before or during the hydrolysis for example during the initial stages of the hydrolysis, by temporarily reducing the pressure until the desired amount of methylene chloride has distilled, or by allowing methylene chloride to distil off throughout the whole of the hydrolysis period.

The process according to the invention is particularly useful in the production of cellulose acetate but may also be applied to the production of other cellulose esters such as cellulose acetate-butyrate or cellulose butyrate.

The process according to the invention is illustrated by the following examples in which parts and percentages are by weight:

*Example 1*

Wood pulp containing 1 part of cellulose and 3.6 per cent of moisture was pretreated with 0.4 part of glacial acetic acid and was then acetylated with 2.76 parts of acetic anhydride and 0.01 part of sulphuric acid in the presence of 4.8 parts of methylene chloride. The temperature was kept below 50° centigrade. The resulting acid solution of cellulose triacetate contained 53 per cent of methylene chloride by weight.

A hydrolysing charge of 0.074 part of sulphuric acid and 0.72 part of water was added and the temperature raised to 60° centigrade, the solution being in an enclosed vessel. 55 per cent of the methylene chloride in the solution was then removed by releasing the pressure and pressure hydrolysis was then re-started and allowed to continue for 1 hour and 45 minutes before the pressure was released. At this stage a second hydrolysing charge of 49 per cent of water based on the weight of the dry pulp was added and hydrolysis was allowed to proceed at atmospheric pressure until the acetyl content of the cellulose acetate was reduced to 54 per cent calculated as acetic acid. The period of time between adding the hydrolysing reagents and stopping the hydrolysis was 4 hours and 25 minutes compared with between 7 and 8 hours normally required for hydrolysis under similar conditions but without the removal of methylene chloride in the early stages of hydrolysis.

The resulting hydrolysed cellulose acetate was dissolved in acetone and dry spun into yarn. No difficulty was encountered in filtration or spinning and the yarn had the following average properties:

| Denier | Tenacity in gms./denier | | | Extension at break, per cent | | |
|---|---|---|---|---|---|---|
| | Dry | Knot | Wet | Dry | Knot | Wet |
| 140 | 1.26 | 1.14 | 0.76 | 28.7 | 22.4 | 37.8 |

*Example 2*

Wood pulp containing 1 part of cellulose and 3.0 per cent of moisture was acetylated with 2.76 parts of acetic anhydride and 0.01 part of sulphuric acid in the presence of 4.8 parts of methylene chloride as described in Example 1.

The solution, containing 53 per cent of methylene chloride, was transferred to a vessel, a hydrolysing charge of 0.72 part of water and 0.74 part of sulphuric acid was added and the vessel was then closed. The temperature was raised to 60° centigrade and hydrolysis was allowed to proceed under pressure for 3½ hours during which time 50 per cent of the methylene chloride in the solution was slowly distilled off. The product obtained had an acetyl content of 52.5 per cent.

A similar acetylation carried out in accordance with normal practice, namely hydrolysing at 60° centigrade with 0.72 part of water and 0.74 part of sulphuric acid under pressure to reduce the acetyl content to about 59 per cent, followed by the addition of a further 0.49 part of water and continuing the hydrolysis at atmospheric pressure, required a total time of 6½ hours to reduce the acetyl content of the cellulose acetate to 54 per cent.

What we claim is:

1. In a process for the production of secondary cellulose acetate by acetylating cellulose in the presence of methylene chloride to form a cellulose triacetate solution containing from 50 to 60 per cent of methylene chloride and hydrolysing the cellulose triacetate while still in solution to a secondary cellulose acetate, the improvement which comprises distilling methylene chloride from the solution before the hydrolysis is completed to remove from 45 to 60 per cent by weight of the methylene chloride and to decrease the methylene chloride content to from 30 to 45 per cent by weight based on the weight of the original solution, whereby the time for hydrolysis is substantially reduced.

2. In a process for the production of secondary cellulose acetate by acetylating cellulose in the presence of methylene chloride to form a cellulose triacetate solution containing from 50 to 60 per cent of methylene chloride and hydrolysing the cellulose triacetate while still in solution to a secondary cellulose acetate, the improvement which comprises distilling methylene chloride from the solution throughout the whole of the hydrolysis period to remove from 45 to 60 per cent by weight of the methylene chloride and to decrease the methylene chloride content to from 30 to 45 per cent by weight based on the weight of the original solution whereby the time for hydrolysis is substantially reduced.

E. P. SHARMAN.
DONALD L. WILSON.

REFERENCES CITED

The following references are of record in the file of this patent:

UNITED STATES PATENTS

| Number | Name | Date |
|---|---|---|
| 1,990,625 | Walter et al. | Feb. 12, 1935 |

FOREIGN PATENTS

| Number | Country | Date |
|---|---|---|
| 337,366 | Great Britain | Oct. 27, 1930 |